United States Patent
Griswold et al.

(10) Patent No.: US 8,343,632 B2
(45) Date of Patent: *Jan. 1, 2013

(54) PAPER RELEASE COMPOSITIONS HAVING IMPROVED ADHESION TO PAPER AND POLYMERIC FILMS

(75) Inventors: Roy Melvin Griswold, Ballston Spa, NY (US); Richard Paul Eckberg, Saratoga Springs, NY (US); Slawomir Rubinsztajn, Niskayuna, NY (US); Stanislaw Slomkowski, Lodz (PL); Anna Kowalewska, Damaniewice (PL); Stanislaw Sosnowski, Lodz (PL)

(73) Assignee: Momentive Performance Materials Inc., Albany, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/907,281

(22) Filed: Oct. 19, 2010

(65) Prior Publication Data

US 2011/0033715 A1 Feb. 10, 2011

Related U.S. Application Data

(63) Continuation of application No. 11/345,757, filed on Feb. 2, 2006, now Pat. No. 7,842,394, which is a continuation of application No. 10/365,212, filed on Feb. 12, 2003, now Pat. No. 7,090,923.

(51) Int. Cl.
*B32B 27/18* (2006.01)
*B32B 27/36* (2006.01)
*B32B 33/00* (2006.01)
*C09D 183/05* (2006.01)
*C09D 183/06* (2006.01)
*C09D 183/07* (2006.01)

(52) U.S. Cl. ........ 428/447; 428/480; 524/860; 524/861; 524/862; 524/863; 524/865; 525/474; 525/476; 525/477; 525/478

(58) Field of Classification Search .................. 428/447, 428/448, 451, 452, 480, 500, 522, 523, 532, 428/537.5; 524/858, 860, 861, 862, 863, 524/865, 866; 525/474, 476, 477, 478, 523, 525/529, 530, 531, 533
See application file for complete search history.

(56) References Cited

U.S. PATENT DOCUMENTS

| | | | |
|---|---|---|---|
| 3,344,111 A | 9/1967 | Chalk | |
| 3,418,731 A | 12/1968 | Anciaux | |
| 3,419,593 A | 12/1968 | Willing | |
| 3,445,420 A | 5/1969 | Kookootsedes et al. | |
| 3,461,185 A | 8/1969 | Brown | |
| 3,882,083 A | 5/1975 | Berger et al. | |
| 3,989,667 A | 11/1976 | Lee et al. | |
| 4,043,977 A | 8/1977 | deMontigny et al. | |
| 4,057,596 A | 11/1977 | Takamizawa et al. | |
| 4,061,609 A | 12/1977 | Bobear | |
| 4,256,870 A | 3/1981 | Eckberg | |
| 4,337,332 A | 6/1982 | Melancon et al. | |
| 4,347,346 A | 8/1982 | Eckberg | |
| 4,386,135 A | 5/1983 | Campbell et al. | |
| 4,465,818 A | 8/1984 | Shirahata et al. | |
| 4,472,563 A | 9/1984 | Chandra et al. | |
| 4,476,166 A | 10/1984 | Eckberg | |
| 4,533,575 A | 8/1985 | Melancon | |
| 4,562,096 A | 12/1985 | Lo et al. | |
| 4,772,515 A | 9/1988 | Hara et al. | |
| 4,783,552 A | 11/1988 | Lo et al. | |
| 5,036,117 A | 7/1991 | Chung et al. | |
| 5,232,959 A | 8/1993 | Togashi et al. | |
| 5,279,860 A * | 1/1994 | Griswold et al. ............. 427/386 |
| 5,440,001 A * | 8/1995 | Griswold et al. ............. 528/15 |
| 5,468,826 A | 11/1995 | Gentle et al. | |
| 5,506,289 A | 4/1996 | McDermott et al. | |
| 5,516,558 A | 5/1996 | O'Brien | |
| 5,567,764 A | 10/1996 | Brasseur et al. | |
| 5,616,672 A * | 4/1997 | O'Brien et al. ............. 528/15 |
| 5,792,812 A * | 8/1998 | Fujiki et al. ............. 525/105 |
| 5,879,809 A * | 3/1999 | Muramatsu et al. ......... 428/412 |
| 5,932,060 A | 8/1999 | O'Brien et al. | |
| 6,716,533 B2 | 4/2004 | Griswold et al. | |
| 7,090,923 B2 * | 8/2006 | Griswold et al. ............. 428/447 |
| 7,842,394 B2 * | 11/2010 | Griswold et al. ............. 428/447 |
| 2003/0088042 A1 | 5/2003 | Griswold et al. | |

FOREIGN PATENT DOCUMENTS

| | | |
|---|---|---|
| EP | 0057984 | 8/1982 |
| EP | 0226934 | 7/1987 |
| EP | 0460698 | 11/1991 |
| EP | 0563704 | 6/1993 |
| EP | 0985711 | 3/2000 |
| JP | 06-100818 | 4/1994 |
| JP | 1995118537 | 5/1995 |
| JP | 11228702 | 8/1999 |
| WO | WO 8102424 | 9/1981 |
| WO | WO 98/28376 | 7/1998 |

OTHER PUBLICATIONS

Database WPI, Section Ch, Week 199944, Derwent Publications Ltd., London, GB, AN 1999-522777, XP002290365.

* cited by examiner

*Primary Examiner* — Michael J Feely
(74) *Attorney, Agent, or Firm* — Dominick G. Vicari; Joseph S. Ostroff; Wiggin and Dana LLP

(57) ABSTRACT

The present invention relates to curable alkenyl based silicone release coating compositions having improved adhesion to paper and polymeric substrates. Furthermore the present invention relates to the process for making a silicone release coating with improved adhesion to paper and polymeric substrates.

11 Claims, No Drawings

PAPER RELEASE COMPOSITIONS HAVING IMPROVED ADHESION TO PAPER AND POLYMERIC FILMS

The present application is a continuation of U.S. application No. 11/345,757 (now U.S. Pat. No. 7,842,394), filed Feb. 2, 2006, which is a continuation of U.S. application Ser. No. 10/365,212 (now U.S. Pat. No. 7,090,923), filed Feb. 12, 2003.

FIELD OF THE INVENTION

The present invention relates to curable alkenyl based silicone release coating compositions having improved adhesion to paper and polymeric substrates. The present invention also relates to additives that improve adhesion of silicone release coating compositions to paper and polymeric substrates. Furthermore the present invention relates to the process for making a silicone release coating with improved adhesion to paper and polymeric substrates.

BACKGROUND OF THE INVENTION

Curable silicone compositions are applied to substrates to aid in the release of adhesive materials thereon. Laminates comprising a release coated paper or polymeric film with a pressure sensitive adhesive and a sheet material that can be a decorative lamina or label are used by stripping off the release liner, which is discarded, and affixing the lamina or label onto a surface.

Typically these release compositions cure by one of two mechanisms, thermal curing or photo-catalytic curing. Thermally curing release systems generally are comprised of the following compositions:

(A) a linear alkenyl substituted polysiloxane polymer that is the primary component or base polymer of the curable composition;
(B) a hydride functional cross-linking silicone, typically a methyl hydrogen siloxane polymer, copolymer or oligomer;
(C) an addition cure hydrosilylation catalysts, typically either a platinum or rhodium based catalyst;
(D) a cure inhibiting compound or mixtures thereof to increase the useful life of the coating bath.

The alkenyl functional silicone polymer release compositions typically used fall into one of two categories:

1) a linear alkenyl chain-stopped polymer:

   4)

where $M^{vi}$ indicates an alkenyl chain-stopping M group or 2) multi-functional alkenyl copolymers:

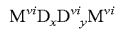   5)

where $D^{vi}$ indicates an alkenyl substituted D group. The alkenyl chain stopped polymers, $M^{vi}D_xM^{vi}$, generally cure faster than the multi-functional copolymers, $M^{vi}D_xD^{vi}_yM^{vi}$. As release composites are delaminated, the formulations based on the linear alkenyl chain-stopped polymers show significant increases in the delaminating force necessary as delaminating speed increases. In contrast, while the multi-functional alkenyl polymers tend to have a slower curing speed the increase in delaminating force with increasing delaminating speed is not nearly as great proportionately.

While the general practice usually employs linear base polymers, (A), solventless, high solids content formulations have been described. As described in U.S. Pat. No. 4,448,815 ('815) a linear alkenyl siloxane base copolymer is a copolymer of:

(1) 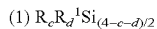   1)

where R is generally an alkyl radical, $R^1$ is a low molecular weight olefinic substituent such as vinyl or allyl, c has value from 0 to 2 and the average of value of the sum c+d is 0.8 to 3; and (2) 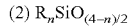   2)

where R is generally an alkyl radical and n has a value of 0.8 to 2.5. The preferred base copolymer of the '815 patent has the following linear structure:

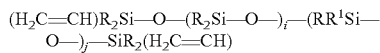

where the subscripts i and j are integers.

U.S. Pat. No. 4,774,111 ('111) describes a variation of the above linear copolymer where the R group in formula 2 is selected from alkyl and alkenyl radicals. The polymer of the '111 patent is defined as being substantially linear, i.e. having no more than a trace amount of T or Q groups. This substantially linear requirement for alkenyl functional heat curing silicone release compositions is repeated in U.S. Pat. Nos. 4,772,515; 4,783,552 and 5,036,117.

In contrast, the possibility of branched alkenyl polymers is admitted by the structural formulas recited in U.S. Pat. No. 4,057,596 ('596). In the '596 patent the composition comprises:

(A') a substantially linear vinyl chain stopped polymer;
(B') a linear methyl hydrogen polymer;
(C') a methyl vinyl polysiloxane having at least three vinyl groups per molecule;
(D') a methyl hydrogen polysiloxane having at least three hydride hydrogen atoms per molecule; and
(E') a platinum hydrosilylation catalyst.

Component (C') is described in the '596 patent as containing $(H_2C\!=\!CH)(CH_3)SiO_{2/2}$ ($D^{vi}$), $(H_2C\!=\!CH)(CH_3)_2SiO_{1/2}$ ($M^{vi}$), and $(H_2C\!=\!CH)SiO_{3/2}$ ($T^{vi}$), units either singly or in combination with $(CH_3)_2SiO_{2/2}$ (D), $(CH_3)_3SiO_{1/2}$ (M), and $(CH_3)SiO_{3/2}$ (T). The optional inclusion of vinyl substituted T units and methyl T units permits the composition of the '596 patent to possess branched structures.

U.S. Pat. No. 4,386,135 describes a terminally unsaturated silicone polymer having the formula

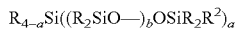   3)

where a may be 2, 3, or 4. When a=4 the formula produces a Q resin. When a=3, a T structure results and the structure possesses only a single branch point. When a=2, the formula devolves to an alkenyl chain stopped linear polymer.

U.S. Pat. No. 5,468,826 teaches adhesion promoting additives comprised of organosiloxane copolymers having $SiO_{4/2}$ units, alkoxy functional groups, epoxy or acryloxyalky groups and silicon hydride functionality. To those skilled in the art, it can be readily recognized that these have the disadvantage of increasing the release force during the delaminating process due to the resinous nature of the additive preventing low release force coatings from being available.

U.S. Pat. No. 3,873,334 teaches adhesion promoting additives comprised of acyloxy functional silanes, which additionally have silicon hydride or alkenyl functionality respectively. However, the acyloxy group liberated has the disadvantages of inhibiting addition cure, therefore slowing the addition curing process; liberating corrosive and objectionable odor hydrolysis products during the coating process. Furthermore, the acyloxy groups remaining in the release coating hydrolyzed over resulting in an undesirable interaction with the adhesive thus leading to undesirable delaminating release properties.

U.S. Pat. No. 5,567,764 teaches alkoxy containing alkenyl functional organopolysiloxanes as adhesion promoters for release coating onto polymeric films.

European patent 057984A2 teaches meth(acryl)oxy functional alkoxysilanes as adhesion promoters for release coatings on polymeric films.

Despite the above cited patents there still remains a need in the industry for release coating compositions, adhesion promoting additives which address the disadvantages of either stable adhesion to both paper and polymeric films, exhibit non-inhibiting effect on the curing, not liberate corrosive hydrolysis products, not exhibit objectionable odor during manufacturing of the laminate construction, not have hydrolysis products that would adversely interact with the adhesive used in the laminating construction, and a cost effective reproducible method of manufacture.

SUMMARY OF THE INVENTION

The present invention provides for a release coating additive for a release coating that provides adhesion to paper and polymeric films that does not inhibit the addition cure process, that does not liberate corrosive hydrolysis products, that does not exhibit an objectionable Odor during the manufacturing of the laminate construction and that does not liberate hydrolysis products which adversely interact with the adhesive used in the laminating construction. Furthermore, the present invention also provides for a process of making an additive exhibiting stable adhesion on paper and polymeric films when added to a release coating.

The release compositions of the present invention comprise additives for improved anchorage of release coatings comprising:

$$(R_a SiO_{(4-a)/2})_n$$

where n is an integer greater than 3, a is from 1 to 3, R is an oxirane or epoxide, or carboxylic add anhydride containing radical having from one to forty carbon atoms, monovalent hydrocarbon or hydrocarbonoxy radicals, hydride atoms, and with at least one oxirane or epoxide, or carboxylic add anhydride and hydride being present on the molecule.

The compositions of the present invention further comprise a curable alkenyl silicone having the formula:

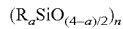

where
$M^{vi} = R^1{}_{3-p} R^2{}_p SiO_{1/2}$, where $R^1$ is selected from the group consisting of one to forty carbon monovalent hydrocarbon radicals and $R^2$ is selected from the group consisting of two to forty carbon atom terminal olefinic monovalent hydrocarbon radicals, where p varies from 1 to 3;
$T = R^3 SiO_{3/2}$ where $R^3$ is selected from the group consisting of $R^1$ and $R^2$;
$D = R^4 R^5 SiO_{2/2}$ where $R^4$ and $R^5$ are each independently selected from the group consisting of $R^1$ and $R^2$; and
$M = R^1{}_3 SiO_{1/2}$ where each $R^1$ is as previously defined and is independently selected; wherein a and b have values ranging from about 2 to about 5, c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5; which composition is preferably crosslinked by a substantially linear hydrogen siloxane selected from the group of compounds:

$MD_e D'_f M$, $MD'_f M$, $MD_e D'_f M'$, $M'D_e D'_f M'$, and $M'D_e M'$ where
$M = R'_3 SiO_{1/2}$,
$M' = H_g R'_{3-g} SiO_{1/2}$, and
$D = R'R'SiO_{2/2}$, and
$D' = R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater. The substantially linear hydrogen siloxane is preferably selected from the group consisting of $MD_e D'_f M$, $MD'_f M$, and mixtures thereof.

Preferably the substituents, $R^1$, of the curable alkenyl silicone are methyl, trifluoropropyl or phenyl and $R^2$ is preferably selected from the group consisting of two to ten carbon atom alkenyl groups.

Further, in the substantially linear hydrogen siloxane R' is preferably methyl, trifluoropropyl or phenyl.

The compositions of the present invention may be utilized as a solventless composition, a composition diluted by a suitable solvent, or as an aqueous emulsion and find particular use in release compositions for paper and polymeric films.

DETAILED DESCRIPTION OF THE INTENTION

Release coatings are part of a laminate wherein a release coating is coated upon a substrate. Generally substrates suitable for release coatings are selected from the group consisting of paper, polymeric films such as those consisting of polyethylene, polypropylene, and polyester.

The release compositions of the present invention comprise additives for improved anchorage of release coatings comprising additives for improved anchorage of release coatings comprising:

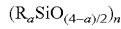

where n is an integer greater than 3, a is from 1 to 3, R is an oxirane or epoxide, or carboxylic acid anhydride containing radical having from one to forty carbon atoms, monovalent hydrocarbon or hydrocarbonoxy radicals, hydride atoms, and with at least one oxirane or epoxide, or carboxylic acid anhydride and hydride being present on the molecule.

The present invention further provides for an alkenyl curable silicone composition of the formula

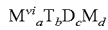

where
$M^{vi} = R^1{}_{3-p} R^2{}_p SiO_{1/2}$, where $R^1$ is selected from the group consisting of one to forty carbon monovalent hydrocarbon radicals and $R^2$ is selected from the group consisting of two to forty carbon atom olefinic monovalent hydrocarbon radicals, where p ranges from 1 to 3; $T = R^3 SiO_{3/2}$ where $R^3$ is selected from the group consisting of $R^1$ and $R^2$, $D = R^4 R^5 SiO_{2/2}$ where $R^4$ and $R^5$ are each independently selected from the group consisting of $R^1$ and $R^2$, and $M=R^1{}_3SiO_{1/2}$ where each $R^1$ is independently selected and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The release compositions of the present invention comprise:

(A) additives for improved anchorage of release coatings comprising:

$$(R_aSiO_{(4-a)/2})_n$$

where n is an integer greater than 3, a is from 1 to 3, R is an oxirane or epoxide, or carboxylic acid anhydride containing radical having from one to forty carbon atoms, monovalent hydrocarbon or hydrocarbonoxy radicals, hydride atoms, and with at least one oxirane or epoxide; or carboxylic acid anhydride and hydride being present on the molecule and (B) an alkenyl silicone having the formula:

$$M^{vi}{}_aT_bD_cM_d$$

where the subscripts a, b, c, and d are as previously defined;

(C) a hydrogen siloxane selected from the group of compounds:

$$MD_eD'_fM$$

$$MD'_fM,$$

$$MD_eD'_fM'$$

$$M'D_eD'_fM',$$

and $$M'D_eM'$$

where M is as previously defined and
$M'=H_gR'_{3-g}SiO_{1/2}$
$D=R'R'SiO_{2/2}$ where each $R'$ is independently selected and
$D'=R'HSiO_{2/2}$
where $R'$ is as previously defined, the subscripts e and f may be zero or positive wherein the sum of e and f ranges from about 10 to about 100 subject to the limitation that the sum of f and g is two or greater and (D) a hydrosilylation catalyst comprising a metal selected from the group consisting of nickel, palladium, platinum, rhodium, iridium, ruthenium and osmium; and (E) a cure inhibitor.

The amount of component (A) that is used in this invention range from about 0.1 to 5.0 parts, preferably from 0.5 to 4.0, and more preferably from about 0.5 to 3.0 parts.

The amounts of Components (B) and (C) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

Broadly stated, Component (D) of the composition of this invention is a catalyst component which facilitates the reaction of the silicon-bonded hydrogen atoms of Component (C) with the silicon-bonded olefinic hydrocarbon radicals of Component (B) and can be any platinum-containing catalyst component. For example, Component (D) can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispensability in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions of this invention is not narrowly limited as long as there is a sufficient amount to accelerate a room temperature reaction between the silicon-bonded hydrogen atoms of Component (C) with the silicon-bonded olefinic hydrocarbon radicals of Component (B). The exact necessary amount of said catalyst component will depend upon the particular catalyst and is not easily predictable. However, for chloroplatinic acid said amount can be as low as one part by weight of platinum for every one million parts by weight of organosilicon Components (B) plus (C). Preferably said amount is at least 10 parts by weight, on the same basis.

For compositions of this invention which are to be used in the coating method of this invention, the amount of platinum-containing catalyst component to be used is preferably sufficient to provide from 10 to 500 parts by weight platinum per one million parts by weight of organopolysiloxane components (B) plus (C).

The hydrosilylation catalyst is selected from the group consisting of catalysts comprising a metal selected from the group consisting of nickel, palladium, platinum, rhodium, iridium, ruthenium and osmium or as taught in U.S. Pat. Nos. 3,159,601; 3,159,662; 3,419,593; 3,715,334; 3,775,452 and 3,814,730.

Inhibitors, component (E), for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420; 4,347,346 and 5,506,289; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

The inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amines, phosphines, phosphites, nitriles, and diaziridines.

Preferred inhibitors for the compositions of this invention are the maleates and alkynyl alcohols.

The amount of Component (E) to be used in the compositions of this invention is not critical and can be any amount that will retard the above-described platinum-catalyzed hydrosilylation reaction at room temperature while not preventing said reaction at moderately elevated temperature, i.e. a temperature that is 25 to 50° C. above room temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B). The range of Component (E) can be 0.1-10% by weight, preferably 0.15-2% by weight, and most preferably 0.2-1% by weight.

The compositions of the present invention may be used as formulations that are free of solvent, i.e. 100% solids, diluted with an organic solvent that is miscible, or as an aqueous emulsion. When the formulation of the present invention is used as a solventless coating, it is preferred that the viscosity of the alkenyl silicone be in a range varying from about 100 to about 10,000 centipoise, preferably from about 125 to about 1,000, more preferably from about 150 to about 500, and most preferably from about 200 to about 300 centipoise. This is most easily accomplished by manipulation of the ratios of the stoichiometric subscripts between the terminal M and $M^{vi}$ groups and the T groups in the formula:

$$M^{vi}_a T_b D_c M_d$$

with one general consideration being that a+d>b. If this condition is not met, the alkenyl silicone can become much more viscous. This does not preclude use of the silicone as a release coating material because the silicone may be dispersed or dissolved in a suitable solvent and coated thereby.

It is generally appreciated that other components may be added to the compositions of the present invention such as bath life extenders as taught in U.S. Pat. Nos. 5,036,117 and 5,516,558; release additives for increasing the release force; fillers, extenders, reactive diluents, anchorage additives that improve adhesion to specific substrates, and the like.

When used as emulsions, the silicones of the present invention are generally emulsified by the addition of non-ionic surfactants, addition of water followed by processing in a colloid mill.

All United States patents referenced herein are herewith and hereby specifically incorporated by reference.

Experimental

The following examples are designed to illustrate the present invention and are not to be construed as limiting the invention as embodied in these specific examples.

EXAMPLE 1

Preparation of Anchorage Additive:

A mixture of allyl glycidyl ether (AGE) (Aldrich, 2.886 g, 25.3 mmol) and polymethylhydrosiloxane (2.97 g, SiH=47.5 mmol) was diluted with toluene (50 mL) and stirred with $0.61 \times 10^{-4}$ ppm platinum at room temperature. A small exothermic effect was observed after about 10 min. Progress of the reaction was followed by $^1$H NMR—after 1 hr 25% of Si—H groups were converted to Si—C bonds. In order to increase conversion of Si—H bonds, the mixture was stirred further for additional 24 hrs. Toluene was evaporated and the residue was characterized by NMR and GPC using $CH_2Cl_2$ as an eluent ($\overline{M}_n$=11100, $\overline{M}_w$=39100, $\overline{M}_w/\overline{M}_n$=3.52). Purified product (5.4 g) was obtained with 95% yield. $^1$H NMR ($CDCl_3$): δ/ppm=0.1 (s, $OSi(CH_3)_3$, terminal), 0.2 (s, —OSi($CH_3$)O—), 0.5 (m, $CH_2$,), 1.65 (m, $CH_2$,), 2.6 and 2.8 (m, $CH_2$,) 3.1 (m, CH), 3.45 (m, $CH_2$,), 3.4 and 3.7 (m, $CH_2$,), 4.7 (m, SiH). $^{29}$Si NMR ($CDCl_3$): δ/ppm=from −34 to −38 (—OSiMeHO—), −19 to −23 (—SiMe($CH_2$)O—), 10 (—$OSiMe_3$).

Release Coating with Anchorage Additive:

A release coating formulation prepared by mixing:

| | |
|---|---|
| [1]SL6626 | 5.0 g |
| [1]SS4300c | 0.16 g |
| Example 1 | 0.1 g |

[1]GE Silicones solventless paper release product

This coating formulation above was coated[2] onto 142 gauge polyester film (PET) corona treated to 54 dyne cm. Samples were cured for the times and the temperatures shown in Table 1 below. These were evaluated after 1 hour and 3 days room temperature aging for anchorage by a finger rub-off method.

[2] Black Clawson Converting Machinery LLC, Fulton, N.Y.

TABLE 1

| Abrasive test of PET films | | | | |
|---|---|---|---|---|
| | 100° C. Rub-off test | | 120° C. Rub-off test | |
| Cure Time, seconds | 1 hr | 3 days | 1 hr | 3 days |
| 10 | -- | - | +/- | +++ |
| 20 | +/- | +/- | +/- | +++ |
| 30 | +/- | ++ | +/- | +++ |
| 40 | -- | +/- | +/- | +++ |
| 60 | -- | +/- | +/- | +++ |

Efficiency of attachment by "Rub-off" was rated as follows:

| | |
|---|---|
| very weakly attached | --- |
| weakly attached | -- |
| could be removed but not very easily | +/- |
| strongly attached | ++ |
| very strongly attached | +++ |

EXAMPLE 2

Preparation of Anchorage Additive:

A mixture of allyl glycidyl ether (AGE) (Aldrich, 142.7 g, 1.25 mol) and polymethylhydrosiloxane (150.0 g, SiH=1.6 wt %) and 20 ppm rhodium using an ethanol solution of tris(dibutylsulfide)rhodium(III)trichloride containing 1.2 wt % rhodium at 120-130° C. after an exotherm to 170° C. for 4 hours. The reaction mixture was filtered then vacuum stripped at 120° C. to yield a 450 cstks reaction product having 0.52 wt % remaining SiH.

Release Coating with Anchorage Additive:

A release coating formulation prepared by mixing:

| | |
|---|---|
| [1]SL6625 | 500.0 g |
| [1]SL6110-D1 | 500.0 g |
| [1]SS4300c | 23.0 g |
| Example 2 Additive | 30.0 g |

[1]GE Silicones solventless paper release product

This coating formulation above were coated[2] onto 142 gauge polyester film (PET) corona treated to 54 dyne cm. Samples were cured for the times and the temperatures shown in Table 2 below. These were evaluated after 1 hour and 5 days room temperature aging for anchorage by a finger rub-off method.

[2] Black Clawson Converting Machinery LLC, Fulton, N.Y.

TABLE 2

Abrasive Test of PET films

| Web Speed, ft/min | Dwell time, sec | Exit Web Temp, °F. | Initial Rub off test | 5-Day Rub off test |
|---|---|---|---|---|
| 100 | 9.0 | 239 | +/− | +/− |
| 200 | 4.5 | 239 | +++ | +++ |
| 300 | 3.0 | 245 | +++ | +++ |
| 100 | 9.0 | 282 | +++ | +++ |
| 200 | 4.5 | 278 | +++ | +++ |
| 300 | 3.0 | 275 | +++ | +++ |
| 400 | 2.25 | 280 | +++ | +++ |
| 100 | 9.0 | 328 | +++ | +++ |
| 200 | 4.5 | 328 | +++ | +++ |
| 300 | 3.0 | 325 | +++ | +++ |
| 400 | 2.25 | 325 | +++ | +++ |

Efficiency of attachment by "rub-off" was rated as follows:

| very weakly attached | --- |
| weakly attached | -- |
| could be removed but not very easy | +/− |
| strongly attached | ++ |
| very strongly attached | +++ |

EXAMPLE 3

Preparation of Anchorage Additives:
Additive A

A mixture of allyl glycidyl ether (AGE) (Aldrich, 79.1 g, 0.69 mol) and polydimethylmethylhydrosiloxane (200.0 g, SiH=1.05 wt %) and 20 ppm rhodium using an ethanol solution of tris(dibutylsulfide)rhodium(III)-trichloride containing 1.2 wt % rhodium at 95-120° C. then held at 95-120° C. for 1 hour. The reaction mixture was vacuum stripped at 120° C. to yield a 199 cstks reaction product having 0.48 wt % remaining SiH.

Additive B

A mixture of allyl glycidyl ether (AGE) (Aldrich, 89.8 g, 0.79 mol) and polydimethylmethylhydrosiloxane (150.0 g, SiH=1.05 wt %) and 20 ppm rhodium using an ethanol solution of tris(dibutylsulfide)rhodium(III)trichloride containing 1.2 wt % rhodium at 95-120° C. then held at 95-120° C. for 1 hour. The reaction mixture was vacuum stripped at 120° C. to yield a 476 cstks reaction product having 0.24 wt % remaining SiH.

Additive C (Comparative)

A mixture of allyl glycidyl ether (AGE) (Aldrich, 662 g, 0.58 mol) and polymethylhydrosiloxane (145.0 g, SiH=1.6 wt %) and vinyltrimethoxysilane (86.0 g, 0.58 mol) and 20 ppm rhodium using an ethanol solution of tris(dibutylsulfide)rhodium(III)trichloride containing 1.2 wt % rhodium at 95-145° C. then held at 95-110° C. for 2 hours. The reaction mixture yielded a 185 cstks reaction product having 0.38 wt % remaining SiH.

Release Coating with Anchorage Additive:
A release coating formulation prepared by mixing:

| [1]SL6625 | 500.0 g |
| [1]SL6110-D1 | 500.0 g |
| [1]SS4300c | 23.0 g |
| Additive | 30.0 g |

[1]GE Silicones solventless paper release product

This coating formulation above were coated[2] onto 142 gauge polyester film (PET) corona treated to 54 dyne cm. Samples were cured for the times and the temperatures shown in Table 3 below. These were evaluated after 72 hours exposed to maximum humidity at 60° C. aging for anchorage by a finger rub-off method.

[2] Black Clawson Converting Machinery LLC, Fulton, N.Y.

TABLE 3

Abrasive Test of PET films

| Additive | Web Speed, ft/min | Dwell time, sec | Exit Web Temp, °F. | Rub off test |
|---|---|---|---|---|
| A | 325 | 2.8 | 269 | ++ |
| A | 375 | 2.4 | 271 | +++ |
| A | 325 | 2.8 | 296 | +++ |
| A | 375 | 2.4 | 296 | +++ |
| B | 325 | 2.8 | 269 | +++ |
| B | 375 | 2.4 | 269 | +++ |
| B | 325 | 2.8 | 298 | +++ |
| B | 375 | 2.4 | 297 | +++ |
| C (Comparative) | 300 | 3.0 | 276 | -- |
| C (Comparative) | 400 | 2.25 | 279 | -- |

Efficiency of attachment by "rub-off" was rated as follows:

| very weakly attached | --- |
| weakly attached | -- |
| could be removed but not very easy | +/− |
| strongly attached | ++ |
| very strongly attached | +++ |

EXAMPLE 4

A mixture of carbic anhydride (13.1 g, 0.08 mol) and polymethylhydrosiloxane (100.0 g, SiH=1.6 wt %) and 25 ppm platinum as Karstdet catalyst and 230.0 g toluene refluxed at 100-107° C. for 5 hours. The reaction mixture was vacuum stripped at 80° C. to yield a reaction product having 1.35 wt % remaining SiH with about 7 mole % carboxylic acid anhydride functionality.

Release Coating with Anchorage Additive:
A release coating formulation prepared by mixing:

| [1]SL6625 | 500.0 g |
| [1]SL6110-D1 | 500.0 g |
| [1]SS4300c | 23.0 g |
| Additive | 30.0 g |

[1] GE Silicone solvents paper release product

This coating formulation above were coated[2] onto 142 gauge polyester film (PET) corona treated to 54 dyne cm.

Samples were cured for the times and the temperatures shown in Table 3 below. These were evaluated after 72 hours exposed to maximum humidity at 60° C. aging for anchorage by a finger rub-off method.
[2] Black Clawson Converting Machinery LLC, Fulton, N.Y.

TABLE 4

Abrasive Test of PET films

| Web Speed, ft/min | Dwell time, sec | Exit Web Temp, ° F. | Rub off test |
|---|---|---|---|
| 150 | 6.0 | 256 | +++ |
| 200 | 4.5 | 249 | +++ |
| 300 | 3.0 | 253 | +++ |

Efficiency of attachment by "rub-off" was rated as follows:

| very weakly attached | --- |
| weakly attached | -- |
| could be removed but not very easy | +/- |
| strongly attached | ++ |
| very strongly attached | +++ |

COMPARISON EXAMPLE 1

Comparison Additive:
An anchorage additive prepared per U.S. Pat. No. 3,873,334 comprised of an epoxy functional silane and vinyltriacetoxysilane was evaluated at 1 and 3 wt. % as in Example 1 above. Rub-off was observed at both additive levels on non-adhesive and adhesive coated PET.

EXAMPLE 5

Example 2 Additive Evaluated in a UV Cured Release Coating:
Qualitative determinations of the effect of Example 2 additive on cure and anchorage of UV curable epoxysilicone coatings were completed using a Filcher Hamilton 2 mil PET substrate. Two UV cure coating formulations were used in these experiments with the composition of Example 2 as candidate anchorage additive.
Composition A: Mixture of 90 parts [1]UV9400 epoxysilicone+5 parts dodecylphenol+5 parts [1]UV9440E di-carbinol stopped silicone fluid+1.5 parts [1]UV9385C iodonium photocatalyst solution.
[1] GE Silicones solventless paper release product
Composition B: Mixture of 100 parts of dimethylepoxy-stopped linear D22 length silicone polymer+2 parts [1]UV9380C sensitized iodonium photocatalyst solution.
Coatings ~1.2 g/m² weight were manually applied to 2 mil PET substrates, then exposed to focused UV light from Hanovia medium pressure mercury vapor lamps mounted in an RPC Model lab UV Processor. Samples were affixed to a carrier board and passed under the lamps on a conveyer. Total UV flux directed at the coatings was modulated by varying lamp power and conveyer speed to furnish either ~65 mJ/cm² or ~160 mJ/cm² UV flux. Coatings were examined for silicone migration to Scotch™ 610 cellophane adhesive tape and for smear and nib-off (tendency of a coating to be readily removed from a substrate by light finger pressure or rub). Results and observations are given in Table 5 below.
Example 2 additive is incompletely miscible with compositions A & B, but formed stable cloudy mixtures when 3 parts were blended with 100 parts of coating. Qualitative results are tabulated below:

TABLE 5

| Coating | Example 2 Additive | UV Flux | Observation |
|---|---|---|---|
| A | None | 65 mJ | Cured - no migration, but very easy rub off With minimal pressure |
| A | None | 160 | (same at 65 mJ) |
| A | 3 phr | 65 | Cure OK - slight migration noted, rub-off Only with hard pressure |
| A | 3 phr | 160 | Excellent cure - no migration, very good Anchorage (very hard rub-off) |
| B | None | 65 | Cured - no migration, hard rub-off (better anchorage than coating A) |
| B | 2 phr | 65 | Undercured - migration and smear noted |
| B | 3 phr | 160 | Excellent cure - no migration, very good Anchorage (very hard rub-off) |

The invention claimed is:
1. A laminate having a substrate and a cured release coating on said substrate,
wherein said substrate is a polyester film and wherein said cured release coating is the cured product of a release coating composition comprising:
(A) an additive for anchorage of a release coating, said additive being a compound of the general formula:

$$(R_aSiO_{(4-a)/2})_n$$

where n is an integer greater than 3, a ranges from about 1 to about 3, R is independently selected from the group consisting of: oxirane containing radicals having from one to forty carbon atoms, epoxide containing radicals having from one to forty carbon atoms, carboxylic acid anhydride containing radicals having from one to forty carbon atoms, monovalent hydrocarbon radicals, monovalent hydrocarbonoxy radicals, and hydride atoms, wherein at least one of said oxirane or epoxide or carboxylic acid anhydride containing radicals are present per molecule, and wherein at least one of said hydride atoms are present per molecule;
(B) a curable alkenyl silicone having the formula $M^{\tilde{n}}_aT_bD_cM_d$ where
$M^{\tilde{n}}=R^1_{3-p}R^2_pSiO_{1/2}$, where $R^1$ is selected from the group consisting of trifluoropropyl and one to forty carbon monovalent hydrocarbon radicals and $R^2$ is selected from the group consisting of two to forty carbon atom terminal olefinic monovalent hydrocarbon radicals, where p ranges from 1 to 3;
$T=R^3SiO_{3/2}$ where $R^3$ is selected from the group consisting of $R^1$ and $R^2$;
$D=R^4R^5SiO_{2/2}$ where $R^4$ and $R^5$ are each independently selected from the group consisting of $R^1$ and $R^2$; and
$M=R^1_3SiO_{1/2}$ where each $R^1$ is as previously defined and is independently selected; wherein a and b have values ranging from 2 to 5, c is an integer ranging from about 50 to about 1,000 and d has a value ranging from 2 to about 0.5;
(C) a hydrogen siloxane selected from the group of compounds;
$MD_eD'_fM$,
$MD'_fM$,
$MD_eD'_fM'$,
$M'D_eD'_fM$, and
$M'D_eM'$, where
$M=R'_3SiO_{1/2}$,
$M'=H_gR'_{3-g}SiO_{1/2}$, and
$D=R'R'SiO_{2/2}$, and D'=R'HSiO$_{2/2}$ wherein each R' in M, M', D, and D' is independently selected from the group consisting of trifluoropropyl and one to forty carbon monovalent hydrocarbon radicals wherein the subscripts e and f may be zero or positive whereby the sum of e and f ranges from about 10 to about 100 subject to the limitation that the sum of f and g is two or greater;

(D) a hydrosilylation catalyst; and (E) an inhibitor.

2. The laminate of claim 1 wherein the viscosity of component (B) of the release coating ranges from about 125 to about 1,000 centipoise.

3. The laminate of claim 1 wherein at least one of said oxirane or epoxide containing radicals and at least one of said hydride atoms are present per molecule of said component (A) of said release coating.

4. The laminate of claim 1, wherein at least one of said carboxylic acid anhydride containing radicals and at least one of said hydride atoms are present per molecule of said component (A) of said release coating.

5. The laminate of claim 1 wherein variable a of component (A) of the release coating is about 3, and component (A) features at least one of said oxirane or epoxide containing radicals per molecule, at least one of said hydride atoms per molecule, and at least one of said hydrocarbonoxy radicals per molecule.

6. The laminate of claim 1 wherein the subscripts a, b and d of component (B) of the release coating satisfy the relationship a+d>b.

7. The laminate of claim 6 wherein the viscosity of component (B) of the release coating ranges from about 100 to about 10,000 centipoise.

8. The laminate of claim 1 where R$^1$ is methyl or phenyl and R$^2$ is selected from the group consisting of two to ten carbon atom alkenyl groups.

9. The laminate of claim 1 wherein where R' is methyl or phenyl.

10. The laminate of claim 1 wherein the hydrogen siloxane is selected from the groups consisting of MD$_e$D'$_f$M, MD'$_f$M, and mixtures thereof, wherein the subscripts e and f may be zero or positive whereby the sum of e and f ranges from about 10 to about 100 subject to the limitation that f is two or greater.

11. The laminate of claim 1 wherein the release coating composition further comprises at least one component selected from the group consisting of bath life extenders, release additives, fillers, extenders, photocatalysts, reactive diluents, and anchorage additives.

* * * * *